(12) United States Patent
Mukai et al.

(10) Patent No.: US 8,022,860 B1
(45) Date of Patent: Sep. 20, 2011

(54) ENCHANCED INTERFERENCE CANCELLATION AND TELEMETRY RECEPTION IN MULTIPATH ENVIRONMENTS WITH A SINGLE PARABOIC DISH ANTENNA USING A FOCAL PLANE ARRAY

(75) Inventors: Ryan Mukai, Rosamond, CA (US); Victor A. Vilnrotter, Glendale, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1015 days.

(21) Appl. No.: 11/781,022

(22) Filed: Jul. 20, 2007

Related U.S. Application Data

(60) Provisional application No. 60/832,918, filed on Jul. 24, 2006.

(51) Int. Cl.
*G01S 7/02* (2006.01)
*G01S 13/66* (2006.01)
*G01S 13/00* (2006.01)

(52) U.S. Cl. .............. 342/60; 342/73; 342/74; 342/75; 342/81; 342/89; 342/175; 342/195; 342/368

(58) Field of Classification Search .............. 342/52, 342/58, 60, 73–81, 104–116, 159–164, 175, 342/192–197, 368–384, 89; 244/3.1–3.3; 343/753–755, 757–766, 772, 781 R, 782, 343/781 P, 781 CA, 832–840, 846, 878–892, 343/907, 912–916, 700 MS, 720, 725–728, 343/776, 779
See application file for complete search history.

(56) References Cited

U.S. PATENT DOCUMENTS

| | | | | |
|---|---|---|---|---|
| 4,349,827 | A * | 9/1982 | Bixler et al. ................. | 343/840 |
| 4,654,622 | A * | 3/1987 | Foss et al. ............... | 343/700 MS |
| 4,980,693 | A * | 12/1990 | Wong et al. ............ | 343/700 MS |
| 5,001,493 | A * | 3/1991 | Patin et al. ............. | 343/700 MS |
| 5,047,776 | A * | 9/1991 | Baller .............................. | 342/52 |
| 5,129,595 | A * | 7/1992 | Thiede et al. ................. | 244/3.16 |
| 5,202,700 | A * | 4/1993 | Miller ........................... | 343/840 |
| 5,237,334 | A * | 8/1993 | Waters .......................... | 343/753 |
| 5,598,173 | A * | 1/1997 | Lo Forti et al. ........... | 343/781 R |

(Continued)

OTHER PUBLICATIONS

Mukai, et al., "Spatio-Temporal Channel Equalization for Aero-nautical Telemetry in Multipath Environments with Focal Plane Arrays", International Telemetering Conference, Oct. 11. 2005 (Paper Presented and Powerpoint slides).

(Continued)

*Primary Examiner* — Bernarr Gregory
(74) *Attorney, Agent, or Firm* — Mark Homer

(57) ABSTRACT

An Advanced Focal Plane Array ("AFPA") for parabolic dish antennas that exploits spatial diversity to achieve better channel equalization performance in the presence of multipath (better than temporal equalization alone), and which is capable of receiving from two or more sources within a field-of-view in the presence of multipath. The AFPA uses a focal plane array of receiving elements plus a spatio-temporal filter that keeps information on the adaptive FIR filter weights, relative amplitudes and phases of the incoming signals, and which employs an Interference Cancelling Constant Modulus Algorithm (IC-CMA) that resolves multiple telemetry streams simultaneously from the respective aero-nautical platforms. This data is sent to an angle estimator to calculate the target's angular position, and then on to Kalman filters FOR smoothing and time series prediction. The resulting velocity and acceleration estimates from the time series data are sent to an antenna control unit (ACU) to be used for pointing control.

18 Claims, 3 Drawing Sheets

U.S. PATENT DOCUMENTS

| | | | |
|---|---|---|---|
| 5,680,419 A | 10/1997 | Bottomley | |
| 5,706,017 A * | 1/1998 | Buttgenbach | 343/753 |
| 5,745,082 A * | 4/1998 | Alder | 343/753 |
| 5,828,344 A * | 10/1998 | Alder et al. | 343/755 |
| 5,990,829 A * | 11/1999 | Garcia | 342/368 |
| 6,006,110 A | 12/1999 | Raleigh | |
| 6,173,014 B1 | 1/2001 | Forssen et al. | |
| 6,208,312 B1 * | 3/2001 | Gould | 343/840 |
| 6,225,955 B1 * | 5/2001 | Chang et al. | 343/720 |
| 6,252,558 B1 * | 6/2001 | Brown et al. | 343/781 R |
| 6,320,553 B1 | 11/2001 | Ergene | |
| 6,356,771 B1 | 3/2002 | Dent | |
| 6,587,246 B1 * | 7/2003 | Anderton et al. | 343/757 |
| 6,943,742 B2 * | 9/2005 | Holly | 343/753 |
| 6,943,745 B2 * | 9/2005 | Rao et al. | 343/757 |
| 7,034,771 B2 * | 4/2006 | Rao et al. | 343/840 |
| 2002/0067311 A1 | 6/2002 | Wildey et al. | |
| 2004/0189538 A1 * | 9/2004 | Rao et al. | 343/757 |

OTHER PUBLICATIONS

Rice, "Aeronautical Telemetry Using Offset QPSK. in Frequency Selective Multipath", IEEE Transactions on Aerospace and Electronic Systems, pp. 758-767, vol. 41, Issue 2, Jun. 2005.

Rice, et al. , "A Wideband Channel Model for Aeronautical Telemetry", IEEE Transactions on Aerospace and Electronic Systems, pp. 57-69, vol. 40, Issue 1, Jan. 2004.

Hansen, et al., "Interference Mitigation Using a Focal Plane Array", Radio Science, Jun. 25, 2005.

Modestino, et al., "Integrated Multielement Receiver Structures for Spatially Distributed Interference Channels", IEEE Transactions on Information Theory, pp. 195-219, vol. IT-32, Mar. 1986.

* cited by examiner

ENCHANCED INTERFERENCE CANCELLATION AND TELEMETRY RECEPTION IN MULTIPATH ENVIRONMENTS WITH A SINGLE PARABOIC DISH ANTENNA USING A FOCAL PLANE ARRAY

CROSS-REFERENCE TO RELATED APPLICATION(S)

The present application derives priority from U.S. provisional application Ser. No. 60/832,918 filed Jul. 24, 2006.

STATEMENT OF GOVERNMENT INTEREST

The invention described hereunder was made in the performance of work under a NASA contract, and is subject to the provisions of Public Law #945-517 (35 U.S.C. 202) in which the Contractor has elected not to retain title.

BACKGROUND a. Field of Invention

The invention relates to multi-beam antenna systems and, more particularly, to a focal plane array (FPA) antenna system that includes a multi-stage interference cancelling adaptive digital filter that allows reception of multiple telemetry streams simultaneously.

b. Background of the Invention

Improving the efficiency of aeronautical telemetry systems often entails dealing with an interference problem known as multipath. Multipath is created by telemetry reflections from various surface/objects, and it usually includes a strong "ground bounce" with complex amplitude and frequency characteristics. As the data rates used for aeronautical telemetry increase, multipath interference is becoming increasingly frequency selective and significantly impairs reception. For example, current United States Air Force (USAF) flight test telemetry ranges commonly suffer from time-varying frequency-selective multipath due to ground reflections of radio-frequency (RF) telemetry signals.

For this reason various smart antenna systems have been developed to reduce multipath. Generally, these smart systems employ multiple antennas in a phased array, followed by some form of diversity processing to combine the multiple signals received into a more accurate whole. These smart systems employ two different combining schemes: 1) diversity combining; and 2) adaptive combining.

The diversity combining scheme exploits the spatial diversity among multiple antenna signals received. Diversity combining is illustrated in U.S. patent application No. 20020067311 by Wildey et al. published Jun. 6, 2002, which shows a phased array antenna with a plurality of antenna elements. The beacon signal is passed to a beacon signal processor which determines the phase differences between the signals received at different antenna elements. The phase differences provides a measure of the physical displacement of the antenna elements from their nominal relative positions, due to distortion of the antenna structure resulting from, for example, gravitational forces. The antenna system can further include means for generating a phase correction corresponding to the phase difference to alter the communication signal phasing and so compensate for distortion of the array structure. This essentially provides a self-phasing phased array in which the radiation pattern automatically adjusts to compensate tor displacement of the antenna elements from their nominal positions relative to one another.

U.S. Pat. No. 5,680,419 to Bottomley (Ericsson) also suggests the elimination of the deleterious effects of fading, time dispersion and interference by using interference rejection and diversity combining.

In contrast, the adaptive combining scheme adjusts the antenna weights dynamically to enhance the desired signal while suppressing interference signals. Most adaptive combining techniques employed today use complex weights on each of the antenna receivers to reject interferences, but in the presence of multiple paths of propagation. However, they tend to "aim" in the direction of one of the paths, thus losing the energy associated with the other paths.

Spatio-temporal equalization (S/T Equalization), which utilizes both spatial and temporal information of received signals, has been drawing much attention as a technique to achieve better performance in antenna systems. By manipulating the specific phase and amplitude relationship of the signals received at the phased antenna array, it is possible to correct various distortions such as reflector surface aberrations in satellite and other communications. This is achieved by controlling signal power division ratios (spatial equalization) and the phase shift (temporal equalization) in the path between the signal source and each antenna element. Spatial diversity equalizers use various algorithms. For example, U.S. Pat. No. 6,006,110 to G. G. Raleigh describes a time-varying vector channel equalization approach for adaptive spatial equalization. Spatio-temporal equalization (S/T-Equalization) can achieve significant enhancement in signal transmission performances over broadband mobile communication channels.

Traditional S/T-Equalization methods employ an adaptive antenna array which has temporal filter at each antenna element (a broadband beam former) or a complex decision feedback equalization scheme which requires a lengthy training sequence, such as a maximum likelihood sequence estimation (MLSE) filter. Though S/T-Equalization methods can achieve good performance, they are currently limited to the aperture plane of a conventional phased array antenna system.

Focal plane array antenna systems differ significantly from phased antenna arrays. Rather than using multiple antennas, a focal plane array feed entails arranging multiple antenna elements within the focal plane of a single parabolic dish antenna in a specific geometry. For example, U.S. Pat. No. 6,320,553 patent to Ergene (Harris) shows a main parabolic reflector and an ellipsoidal subreflector, with a transversely positioned feed and an axial feed located in the focal region of the main reflector. In this case the patent notes that mutual blockage can occur between several different feeds in the same antenna configuration, and the two feeds are herein designed to receive and transmit signals in different frequency bands (e.g. C, KU and X-bands) from a single antenna dish system without blockage.

Though S/T-Equalization methods have used in to the aperture plane of a conventional phased array with multiple antennas, they have not been widely applied to the local plane of a parabolic dish antenna. Nevertheless, S/T-Equalization in focal plane array antennas can endow receivers with the immunity against co-channel interference (CCI) and inter-symbol interference (ISI), aiming at allowing all users to use the same frequency- and time-slots without spreading their signals in the frequency domain. See, for example, M. Rice and E. Satorius, Equalization Techniques For Multipath Mitigation In Aeronautical Telemetry, MILCOM 2004 Proceedings, volume 1, pages 65-70 (Oct-Nov 2004), which proposed a single channel equalizer to improve the performance of telemetry reception systems. This reference discloses a single-channel equalizer with spatial but not temporal processing.

The present inventors herein demonstrate that it is possible to extend the single-channel equalization scheme in a focal plane array to multiple spatial channels in order to fully exploit spatial diversity, thereby achieving further reductions in interference, resulting in even more reliable telemetry reception. The invention described herein applies spatio-temporal equalization techniques, not to the aperture plane of a conventional phased array, but instead to the focal plane of a single parabolic dish antenna, it is possible to improve its performance under multipath conditions while maintaining high precision pointing capability. A focal-plane tapped delay-line approach is herein proposed that is fundamentally different from the phased-array approaches described above, since focal-plane processing of multipath signals and other interfering sources can be separated out without complicated signal processing (under favorable conditions). This is an added bonus of using focal-plane arrays instead of conventional phased-array antennas, when appropriate. Moreover, this approach makes it possible to provide a single-antenna system capable or receiving telemetry from two or more sources within the field-of-view, even in the presence of multipath. This capability promises significant value whenever it is desireable for one antenna to receive more than one stream simultaneously under many conditions, such as in aeronautical activities where existing parabolic ground antennas could receive telemetry from formation flyers within the fields-of-view.

SUMMARY OF THE INVENTION

It is, therefore, an object of the present invention to provide a spatio-temporal equalizer for the focal plane of a parabolic dish antenna.

It is another object to provide a multi-element focal plane array that gives spatial diversity reception and temporal channel equalization.

It is another object to provide a multi-element feed in place of the traditional single-element feed in the focal plane of the parabolic receiving antenna that gives spatial diversity reception and temporal channel equalization.

It is another object to exploit the above-described spatial diversity reception for reception of multiple telemetry streams simultaneously, thereby enabling a single parabolic dish antenna to receive telemetry from multiple sources within the field-of-view, even in the presence of multipath.

According to the present invention, the above-described and other objects are accomplished by providing an Advanced Focal Plane Array ("AFPA") comprising a radio frequency (RF) focal plane array of receiving elements (an array of feeds) in the focal plane of a parabolic dish antenna, which allows the exploitation of spatial diversity to achieve better channel equalization performance in the presence of multipath than would be achievable with temporal equalization alone. The use of an array of receiving elements provides two advantages over a single one. First, it enables constructive addition of the incoming multipath ray, resulting in improved bit error rate (BER) performance under a range of operating conditions. Second, the presence of multiple elements in the focal plane enables real-time extraction of pointing information that can be used to identify both the main ray and the ground reflection ray. This enables robust pointing even when multipath is present. A spatio-temporal filter keeps information on the adaptive FIR filter weights, relative amplitudes and phases of the incoming signals. The spatio-temporal filter may employ a range of adaptive algorithms including, but not limited to, Least Mean Squares (LMS), Recursive Least Squares (RLS), Sample Matrix Inverse (SMI), etc. The algorithm chosen for the present realization of this invention is an Interference Cancelling Constant Modulus Algorithm (IC-CMA) that resolves multiple telemetry streams simultaneously from the respective aero-nautical platforms. The IC-CMA algorithm used in the present realization is described in the following reference: Richard Gooch, Brian Sublett, and Robert Lonski. "Adaptive beamformers in communications and direction finding systems." In *Twenty-Fourth Asilomar Conference on Signals, Systems and Computers,* volume 1, pages 11-15, Nov 1990, and it will be briefly described here since it is used in the present realization. Indeed, a single parabolic dish antenna can receive telemetry from two or more sources within the field-of-view, even in the presence of multipath. This data is sent to an angle estimator, a unit that computes instantaneous estimates of the target's angular position with respect to the antenna's pointing axis. Possible angle estimators encompassed herein include, but are not limited to, the neural network and interpolated least squares estimators described in the following reference: Mukai, R.; Vilnrotter, V. A.; Arabshahi, P.; Jamnejad V., "Adaptive acquisition and tracking for deep space array feed antennas", *IEEE Transactions on Neural Networks,* Vol. 13, No. 5, September 2002 where some or all of the weights of the spatio-temporal filter may be applied as inputs to the methods described in the reference paper. Angle estimation methods using the estimated centroid based upon relative power measurements in the focal plane feeds or based upon the magnitudes of the weights in the spatio-temporal filter are also included in this invention. The time series of these estimates is then sent to two 3-state Kalman filters which not only provide smoothing and time series prediction but which also extract velocity and acceleration estimates from the time series data. The outputs of the Kalman filters are sent to an antenna control unit (ACU) to be used for pointing control. The principal advantages of the AFPA are that it exploits spatial diversity to combat multipath, which would otherwise result in increased bit error rates and reduced telemetry performance. It is also capable of receiving telemetry from two or more sources within the field-of-view, even in the presence of multipath. Furthermore, under most geometric conditions, spatially separate sources have spatially separate images in the focal plane of the receiving antenna. Since the nature of radio-frequency (RF) optics results in spatial separation of the sources in the focal plane under most geometric conditions, the process of separating signals from different sources is simplified considerably, and cross-correlations between spatially separate sources may be either reduced or substantially eliminated by this spatial separation. This will considerably simplify signal processing by eliminating cross-correlation interference under many conditions. Even when cross-correlations are present due to incomplete spatial separation, partial spatial separation will often greatly reduce the effects of cross-correlation terms, allowing for more robust separation of incoming signals than would be possible with a convention aperture-plane phased array. This is another principal advantage of the present invention over existing phased array systems.

In addition to being useful for flight test telemetry, this system is adaptable to radar applications as well as to other aeronautical communications applications including civilian air traffic.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

DETAILED DESCRIPTION OF THE PREFERRED EMBODIMENTS

The present invention is an Advanced Focal Plane Array ("AFPA") antenna system comprising a multi-element focal plane array having an array of feeds in the focal plane of a parabolic dish antenna, plus a multi-stage interference cancelling adaptive digital filter. The multi-element array allows spatial diversity to achieve better channel equalization performance in the presence of multipath than would be achievable with temporal equalization alone. The multi-stage adaptive digital filter capitalizes on this diversity to allow reception of multiple telemetry streams simultaneously, thereby enabling a single parabolic dish antenna to receive telemetry front multiple sources within the field-of-view, even in the presence of multipath.

Figure 1:
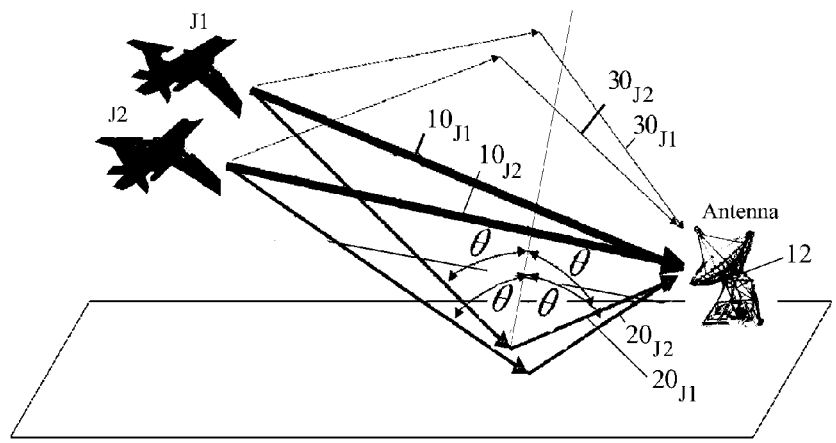
FIG. 1 is a perspective diagrammatic view of the Focal Plane Array ("AFPA") antenna system illustrating telemetry rays from multiple (here two) sources.

FIG. 1 is a perspective diagrammatic view of the Focal Plane Array ("AFPA") antenna system illustrating telemetry rays from multiple sources, here two being shown for illustration although a larger number is possible. For purposes of description we assume a three-ray model as shown in FIG. 1, times two aero-nautical sources J1, J2 (here formation aircraft), in which the signal observed at the ground antenna consists of the following components:

Two direct rays $10_{J1}$, $10_{J2}$ (each assumed to originate directly from the respective aero-nautical platforms J1, J2.

Two ground reflection rays $20_{J1}$, $20_{J2}$ (where the ground is assumed to be a flat mirror that follows the well-known law of reflection). These are the principal multipath components.

Third rays $30_{J1}$, $30_{J2}$ reflected from the environment. These rays are much weaker than either the direct rays or the ground reflection rays. The third rays are of such low amplitude that they can be ignored and most of the multipath effects can be attributed to the stronger ground reflection rays.

Figure 2:
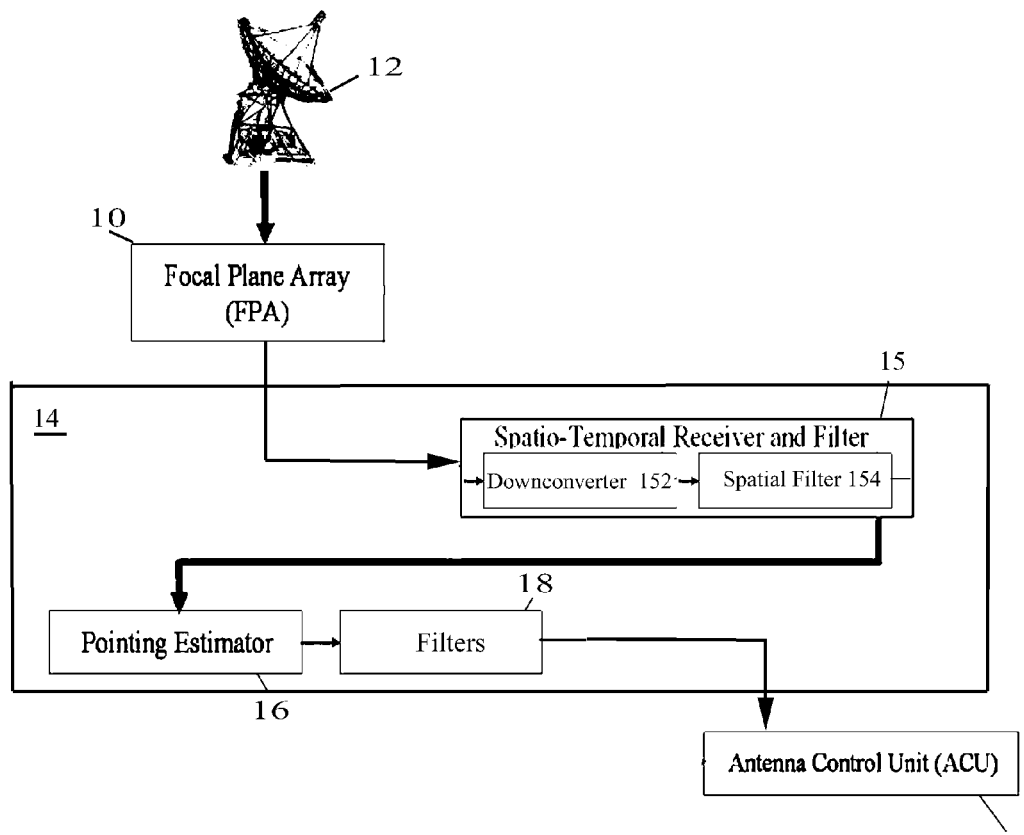
FIG. 2 is a system block diagram of the AFPA system according to one embodiment of the present invention.

A system block diagram of the AFPA system according to the present invention is shown in FIG. 2. The AFPA employs a radio frequency focal plane array (FPA) 10 placed in the local plane of the receiving parabolic antenna 12. The RF focal plane array 10 comprises a plurality of receiving elements ("horns"). The telemetry received from the RF focal plane array 10 is sent to a processing system 14 that allows reception of multiple telemetry streams simultaneously, here two $10_{J1}$, $10_{J2}$ originating directly from the respective aero-nautical platforms J1, J2. Processing system 14 takes advantage of the spatial diversity of the multi-element array 10 to allow single parabolic dish antenna 12 to receive telemetry from two or more sources within the field-of-view, even in the presence of multipath. Processing system 14 further includes a spatio-temporal receiver/filter 15 connected to an angle ("pointing") estimator 16, in turn connected to Kalman Filter(s) 18. The spatio-temporal receiver/filter 15 further includes a downconverter 152 that serves as a receiver front end, and spatio/temporal FIR filter section 154.

In general operation, the RF signals received by the AFPA 10 are downconverted by spatio-temporal receiver/filter 15 to complex baseband, and spatio-temporal FIR filter structures 154 in receiver/filter 15 perform coherent combining. The FIR filter structures 154 keep information on the adaptive FIR filter weights, relative amplitudes and phases of the incoming signals. This information is sent to an angle ("pointing") estimator 16, which computes instantaneous estimates of the target's angular position with respect to the antenna's pointing axis and produces time series data. The time series estimates of the target's angular position with respect to the antenna's pointing axis are then sent to Filters 18. The Filters 18 are preferably 3-state Kalman filters which not only provide smoothing and time series prediction but which also extract angular velocity and acceleration estimates from the time series data. The outputs of the Filters 18 are sent to an antenna control unit (ACU) 20 to be used for pointing control.

A particular embodiment of the multi-element focal plane array 10 will now be described that uses a seven-element feed in place of the traditional single-element feed in the focal plane of the parabolic receiving antenna. This exploits spatial diversity reception in addition to temporal channel equalization in combatting the effects of multipath.

Figure 4:
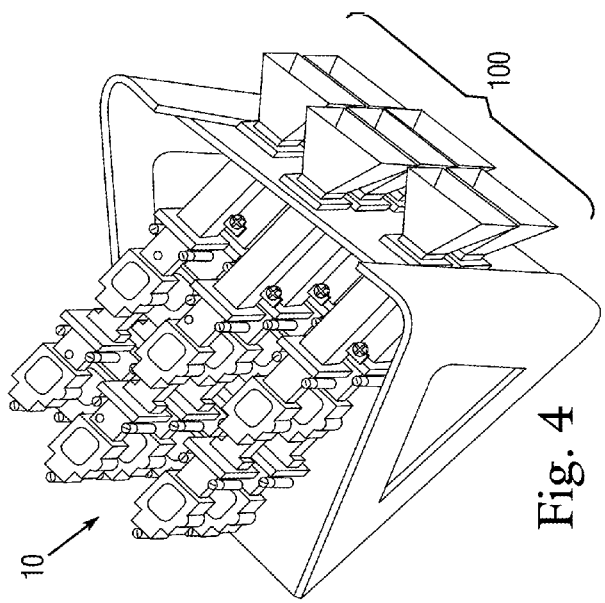
FIG. 4 is a side perspective view of the multi-element focal plane array 10 as in FIG. 3.
Figure 3:
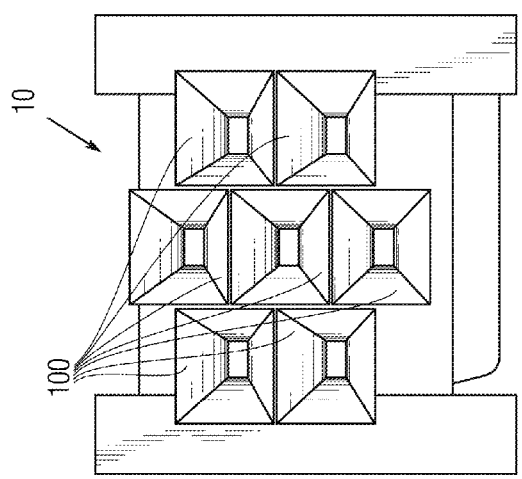
FIG. 3 is a front view of an exemplary multi-element plane array 10 as in FIG. 1, in this case containing seven elements or "horns" 100 for reception.

FIG, 3 is a from view of an exemplary multi-element focal plane array 10, the illustrated embodiment containing seven elements or "horns" 100 for reception, in this case for 15 GHz Ku-band signals. FIG. 4 is a side perspective view. A variety of Ku-band feed horns are commercially available for this purpose, including AFC™ single element Ku-band antenna feeds and others. The elements 100 are preferably arranged in a hexagonal or nearly hexagonal geometry rather than a vertical stack. One skilled in the art should understand that two or more horns 100 may suffice, the horns 100 may be adapted for other RF bands, and a hexagonal geometry is but one presently preferred embodiment. In the seven-element hexagonal array spatial multipath is typically compensated by the vertical stack of three horns, but there are four additional horns on the sides. These are used to enable reliable pointing as disclosed in Mukai et al., "*Adaptive Acquisition And Tracking For Deep Space Array Feed Antennas*", IEEE Transactions on Neural Networks, 13(5:1159-1162, Sep 2002); and Vilnrotter et al., "*Demonstration And Evaluation Of The Ka-Band Array Feed Compensation System On The 70-Meter Antenna At DSS 15*", TMO Progress Report 42-139 (Nov 1999).

The seven elements 100 produce seven RF signals which are downconverted by spatio-temporal receiver/filter 15 (FIG. 2) to complex baseband. The downconversion may be accomplished using a commercially-available IF Downconverter 152. The downconverter 152 may, for example, be an Avtec™ downconverter which transforms analog RF signals into an accessible digital format suitable for further processing. The Avtec™ unit is programmable, configured and controlled by is USB-connection to a computer.

The multiple receiving elements 100 as described above provide three advantages over a single horn. First, they enable constructive addition of the incoming multipath ray, resulting in improved bit error rate (BER) performance under a range of operating conditions. Second, the presence of multiple horns in the focal plane enables real-time extraction of pointing information that can be used to identify both the main ray and the ground reflection ray as will be described. This enables robust pointing even when multipath is present. Third, the use of a two-dimensional array permits resolution of spatially separated signals, provided there is sufficient angular separation among sources. This third advantage is an essential feature of the present invention because it allows a single parabolic dish antenna to receive telemetry from two or more sources within the field-of-view, in the presence of multipath, and yet distinguish all signal components.

Referring hack to FIG. 1, to illustrate the advantages of the multi-stage filter 15, we suppose that the ground reflection (or "multipath") rays $20_{J1}$, $20_{J2}$ have an amplitude 0.96 times that of the direct rays rays $10_{J1}$, $10_{J2}$ originating from the aeronautical platforms, and reflection rays rays $30_{J1}$, $30_{J2}$ are 180° degrees out-of-phase with the direct rays $10_{J1}$, $10_{J2}$. The case of a multipath ray $20_{J1}$, $20_{J2}$ that is exactly out-of-phase with the main rays $10_{J1}$, $10_{J2}$ represent a worst-case channel equalization scenario, and the focal plane is graphically illustrated in FIG. 5, which is an example of such multipath for two sources J1, J2. Image "A" is the main ray $10_{J2}$ from the primary source J2. Image "B" is the multipath ray $20_{J2}$ from the primary source J2. Image "C" is the main ray $10_{J1}$ from at secondary source J1 that is at a higher altitude. Note that the higher altitude will result in a lower main ray image since the ray from a source at a higher altitude is reflected by the main reflector to a lower point on the focal plane array (FPA). Since a prime-focus system, a radio-frequency optical system with a single reflector, is used in this case, the image will be inverted. Since the angle of reflection with respect to the ground for this source is a steeper angle than for the primary source, the secondary multipath ray $30_{J1}$ due to ground reflection will also be higher, and its image in the focal plane is denoted "D".

Figure 6:
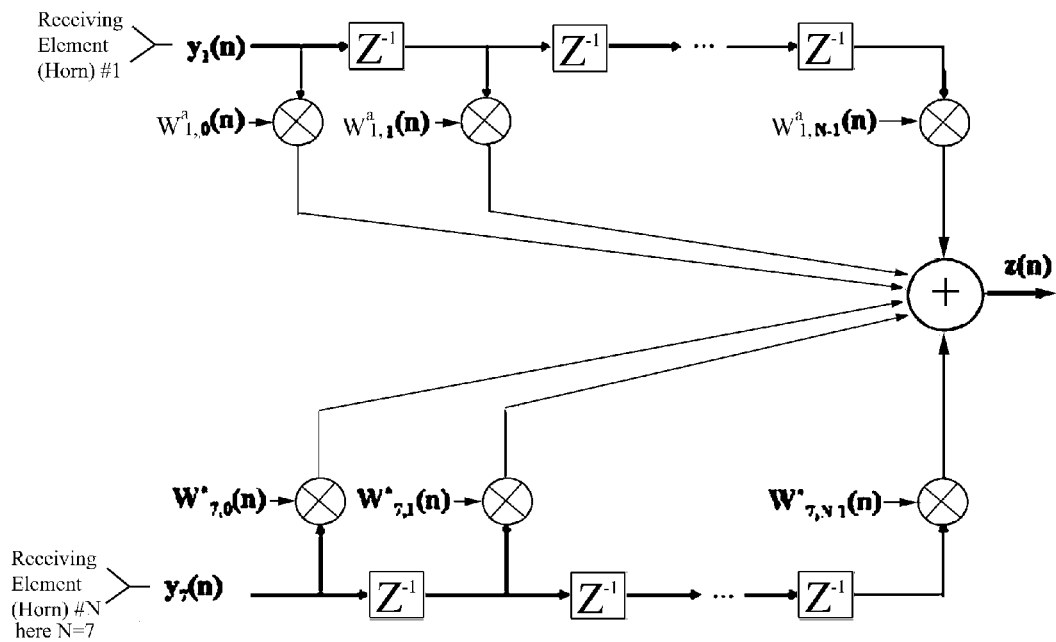
FIG. 6 is a schematic diagram of an FIR filter structure 154 in receiver/filter 15 for a single source.

FIG. 6 is a schematic diagram of an FIR filter structure 154 in receiver/filter 15 for a single source. This basic filter structure must be adapted for two or more sources in the present invention. Depending on the expected usage of this system, a wide range of signal processing algorithms may be employed to perform weight adaptation in the spatio-temporal filter structure. To do this a unique signal processing algorithm is used in the spatiotemporal FIR filter structures 154 in receiver/filter 15, said algorithm herein being called an Interference Cancelling Constant Modulus Algorithm (IC-CMA). This is a derivation of the known Constant Modulus Algorithm (CMA) set forth by Simon S. Haykin, "Adaptive Filter Theory", 3rd. ed. Prentice-Hall, Upper Saddle River, N.J. (1996), and described in detail in Gooch et al., Adaptive Beamformers In Communications And Direction Finding Systems, Twenty-Fourth Asilomar Conference on Signals, Systems & Computers, vol. 1, pp. 11-15 (Nov. 1989) (the latter adds interference cancelling and multiple beamforming). For present purposes the modulation format is assumed to be SOQPSK-TG, which is a constant envelope modulation commonly used on flight test telemetry ranges. CMA exhibits a strong tendency to lock onto one constant envelope source while supressing others when used in the presence of multiple constant envelope sources. Hence, if the stronger sources are suppressed at the earlier stages of IC-CMA, then the weaker sources can often be recovered. If it first helpful to introduce some definitions for the multisource case:

L: The number of FIR taps in each of the seven tapped delay lines in the spatio-temporal filter.

J: The number of sources. The algorithm is herein defined for a two-source (j1,j2) case, though any number of sources is possible.

xj(k): The signal transmitted by source j. For SOQPSK-TG signals, we as one |xj(k)|=1 for all j.

yj,i(k): The signal from source j observed in FPA channel i. This is a delayed, phase-shifted, and attenuated version of xj(k) which may also contain a multipath component depending on the geometric situation.

$Y_j(k)$: The vector of inputs $[y_{j,1}(k), \ldots y_{j,1}(k-L+1), y_{j,2}(k) \ldots y_{j,2}(k-L+1) \ldots y_{j,7}(k-L+1)]T$.

$w_{j,i,m}(k)$: The combining weight for source j corresponding to FPA channel i at FIR tap delay m.

$W_j(k)$: The vector of tap weights $[w_{j,1,i}(k) \ldots w_{j,1,L-1}(k), w_{j,2,i}(k) \ldots w_{j-2\times L-1}(k) \ldots w_{j,7\times L-1}(k)]^T$ $z_j(k)$: The filtered output corresponding to source j.

$W_{j,AC}(k)$: The adaptive cancellation weights. This vector is of the same size as $W_j(k)$.

a: The adaptation rate parameter for adjusting the weights $W_j(k)$.

$a_{AC}$: The adaptation rate parameter for the adaptive cancellation (AC) weights.

$n_i(k)$: The additive white Gaussian noise (AWGN) sample in channel i at time k.

N(k): The vector $[n_1(k) \ldots n_j(k-L+1), n_2(k) \ldots n_2(k-L+1) \ldots n_7(k-L+1)]^T$ of noise samples.

Y(k): The total signal vector defined by $(\Sigma_{j\times 1}{}^J Y_j(k))+N(k)$

The key advantages of this invention can be illustrated via the following example, where we assume idealized conditions for clarity. Suppose there are two sources (such as airplanes) within the receiving antenna's field-of-view (FOV), flying close to the ground at a great distance from the antenna, thus producing multipath signals also assumed to be within the antenna's FOV. Here we denote the signals received directly from the two sources as $s_1(t)$, $s_2(t)$, and their respective multipath components as $\beta_1 s(t-\tau_1)$, $\beta_2 s(t-\tau_2)$, $0 \leq \beta_1$, $\beta_2 \leq 1$. Clearly, the multipath components are attenuated and delayed versions of the directly received signals. If a single horn in the focal-plane is used to communicate with the desired source, without additional signal processing to recombine the direct and multipath signals from the desired source, then this receiver observes the sum of the desired signal, the interference signal, and their respective multipath components, all in the presence of additive noise. After sampling, the received samples in the digital receiver are of the form:

$$y(k)=s_1(k)+s_2(k)+\beta_1 s_i(k-\tau_1)+\beta_2 s_2(t-\tau_2)+n(k)$$

where n(k) are zero-mean AWNG samples with variance $\sigma^2$. If the receiver is tuned to the first direct source signal, then it own multipath plus the interfering signal and that signal's multipath serve as sources of noise, along with the inevitable AWGN receiver noise. If both sources and their multipath components are independent and of equal strength (i.e. the delays are sufficiently large so that there is no correlation between each signal and its delayed version), then we have $|s_i| \approx \beta_i \approx 1$, i=1, 2, then the signal-to-interferer-plus-noise ratio for this case is:

$$SINR_{single\,horn} = E|s_i(k)|^2 \left\{ E\left|s_j(k)\right|^2_{j\neq i} + \sum_i \beta_i E|s_i(k-\tau_i)|^2 + \sigma^2 \right\}^{-1}$$

On the other hand, if we were able to separate out the sources and their multipath components via a focal-plane array, as proposed in this invention, then the SINR to the array channel receiving the desired signal would become $SINR_{FPA}=E|s_i(k)|^2/\sigma^2$. This demonstrates the following it result for the assumed conditions:

$$\lim_{\sigma^2 \to 0} SINR_{single\,horn} = 1/3, \quad \lim_{\sigma^2 \to 0} SINR_{PPA} = \infty$$

In other words, the upper bound for the SINR of the single-horn receiver merely ⅓, or −4.8 dB, due to interference, whereas the SINR of the FPA receiver is limited only by additive thermal noise. For the realistic case where the FPA receiver is operating at an SINR of 10 dB, the SINR of the single-horn receiver is merely ⅓.1, or −4.9 dB. The FPA receiver is better than the non-processing single-horn receiver by 14.9 dB, which is a very significant margin.

Even if we assume perfect combining of the desired signal and its multipath component, properly delayed and phased to add coherently, and assuming all delayed versions to be independent of the desired signal, a similar argument shows that the SINR of the processing single-horn receiver becomes 4/6.1=0.656, or −1.8 dR, which is still approximately 12 dB worse than the FPA receiver proposed in this invention.

Unfortunately, the ideal conditions of perfect spatial separation described above cannot always be obtained in practice, hence more complicated processing and somewhat reduced gain must be accepted. The following development addresses the general case, where the above ideal model cannot be assumed.

In the basic CMA algorithm presented by Haykin, supra, the operation of the single source filter shown in FIG. 6 would be described by the following equation (1):

$$z(k)=W^H(k)Y(k) \quad (1)$$

Furthermore, the CMA weight updates would be given by the following equation (2):

$$W(k+1)=W(k)+az^*(k)(1-|z(k)|^2)Y(k) \quad (2)$$

However, when multiple (J) sources are present, the actual received signal vector at the array is given by the following equation (3):

$$Y(k)=(\Sigma_{j\times 1}{}^J Y_j(k))+N(k) \quad (3)$$

Hence, there is a need to use an adaptive interference cancellation scheme to help separate these sources. If the CMA algorithm were to be run on the array signal Y(k), it would tend to converge to the source with the highest received power under many conditions. However, if the desired source and the interferer have the same received power, then the basic CMA algorithm may exhibit only a 50% chance of acquiring the correct source. Hence, equations (1) and (2) are an important part of IC-CMA, but they do not provide a complete picture. An interference cancellation step is the key. For this purpose we make the following assumptions:

1. Each signal has zero mean, which is true of SOQPSK-TG signals and of many other types of signals and interference. Hence, $E[Y_j(k)]=0$ and $E[x_j(k)]=0$.

2. The transmitted signals are independent of each other. Independent, zero-mean transmitted signals must satisfy: $E[xj1(n) \, x^*j2(n)]=0$ for all $j1 \neq j2$.

3. As a result, the received signals are also independent of each ether and will therefore satisfy: $E[Y_{j1})k)Y_{j2}{}^H(k)]=0$ for all for all $j1 \neq j2$.

Under the assumption of independent, zero-mean signals, we can state the following. equation (4):

$$E[Y(k)x_j^*(k)]=E[Y_j(k)x_j^*(k)] \quad (4)$$

We now define $X_j(k)=Y_j(k)x_j^*(k)$ to be the instantaneous approximation to the cross correlation between signal $x_j(k)$ and the received signal vector Y(k), The cross correlation is used to cancel the contribution of source j. Since we have assumed, for each transmitted SOQPSK-TG signal, that $|x_j(k)|=1$, we now have $x_j(k)x^*j(k)]=1$. This allows us to write: $Y_j(k)=X_j(k)x_j(k)$.

However, we do not have $x_j(k)$ at the receiver. Instead, we have an estimate $z_j(k)$ at the receiver. Furthermore, we cannot compute the true expected value in equation (4) in the receiver instead, we will replace $x_j(k)$ with our best estimate, which is $z_j(k)$. Again, since all sources transmit a constant modulus SOQPSK-TG signal, each $z_j(k)$ tends to correspond to a single source with all other sources suppressed. Furthermore, we will replace the expected value with the instantaneous sample. The approximation that results is shown in equation (5):

$$Y(k)x_j(k) \approx Y_j(k)z_j^*(k) \quad (5)$$

An instantaneous approximation to the cross correlation is given by the following equation (6):

$$X_j(k)=Y(k)z_j^*(k) \quad (6)$$

Hence, the contribution of source k to the total signal Y(k) in equation (3) can be estimated and subsequently subtracted from the array sum if $X_j(k)$ and $x_j(k)$ are known. In practice, the approximation in equation (6) will be sufficiently accurate to remove most of the contribution of source j from the overall signal vector Y(k). This lies at the heart of the improved IC-CMA algorithm of the present invention.

Define:

$$Z_j(k)=Y(k)-(\Sigma_{j\times 1}{}^{j-1}Y_j(k)) \quad (7)$$

Here, $Z_j(k)$ is the received vector signal with the contributions of the first (j−1) sources subtracted out. By convention, for the first, source, we have:

$$Z_1(k)=Y(k)$$

Since we only have the estimate zj(k) of the original signal xj(k), we could use the following approximation of equation (6):

$$Z_j(k)=Y(k)-(\Sigma_{i\times 1}{}^{j-1}X_i(k)z_i(k))$$

However, the approximation in equation (6) is not always reliable, especially if there is a significant amount of noise present. Instead, it is appropriate to replace the term Xi(k) with an interference cancellation weight term:

$$W_{j,AC}(k)=X_j(k)$$

The above approximation is computed adaptively as shown by equation (7):

$$W_{j,AC}(k+1)=(1-a_{AC})w_{j,AC}(k)+a_{AC}Z_j(k)z_j^*(k) \quad (7)$$

Equation (7) provides a real-time adaptive method for estimating the necessary cross-correlation for interference cancellation, and $W_{j,AC}$ is taken as an estimate of $E[Y_j(k)x_j^*(k)]$ Using the above-described definitions we can now describe the IC-CMA algorithm of the present invention. To receive up to J signals, the algorithm must contain J stages. Each stage is described by the following equations:

$$z_j(k)=w_j^H(k)\hat{Z}_j(k) \quad (8)$$

$$\hat{z}_j(k) = Y(k) - \sum_{i=1}^{j-1}(W_{i,AC}(k)z_j(k))$$

$$W_j(k+1)=W_j(k)+a\,z_j^*(k)(1-|z_j(k)|^2)\hat{Z}_j(k) \quad (9)$$

$$W_{j,AC}(k+1)=(1-a_{AC})W_{j,AC}(k)+a_{AC}\hat{Z}_j(k)z_j'(k) \quad (10)$$

Since the interference cancellation stage, which is designed to remove the effects of previous signals, works with approximate correlations, there will be some residual portions of the interference signals left over even after adaptive cancellation. As a result, BER performance will often be worse than in the pure non-interference case.

In the interference cancellation case, one may simply ignore the output signals $z_j(k)$ that are believed to correspond to undesired interferers. If there is only one desired source, and if the desired source has the highest received power, then the CMA algorithm without the additional interference cancellation capability is often sufficient. However, if the desired source has the same or less received power than the interfering source, IC-CMA provides a useful cancellation capability, IC-CMA is also useful in those cases in which telemetry from more than one source is desired.

Simulations have been performed to test the performance of IC-CMA with two SOQPSK-TG sources at equal received power. Since, in the equal power case, the first CMA stage may lock on to either source with equal likelihood, IC-CMA is useful either for cancelling a second source or for receiving its telemetry stream. Since SOQPSK-TG is a constant envelope modulation, a single stage of the IC-CMA algorithm (stages are defined later) will tend to converge on just one of the multiple signals, effectively cancelling the effects of the other signals. The basic CMA algorithm, without interference cancellation, would ordinarily have only a fifty-percent probability of locking on to the primary desired source in this case.

The geometric situation involving two static sources is described as follows. All coordinates are Cartesian and are given in meters. The z-coordinate is assumed to refer to altitude above the ground, which is treated as a flat plane. Major simulation assumptions are described below.

1. The antenna is located at point (0, 0, 550). That is, the antenna is on a hill 550 meters above the origin of the coordinate system.

2. The first source is located at (30000, 0, 550). This means the first source is 30 km away from the antenna along the x-axis and is also 550 meters above the ground.

3. The second source is located at (30000, −900, 1150). This means the second source is at an altitude of 1150 meters, which is 600 meters higher than the first. It is also offset in the y-direction by 900 meters.

4. Both sources transmit SOQPSK-TG at 5 Mbps.

5. Both sources have the same transmit power.

6. We assume "worst-case" multipath and have assigned the multipath ray an amplitude of 0.96 times that of the main ray and a phase of 180 degrees with respect to the main ray.

7. There are 7 FIR taps behind each horn.

8. a=0.001

9. $a_{AC}$=0.001

Figure 5:
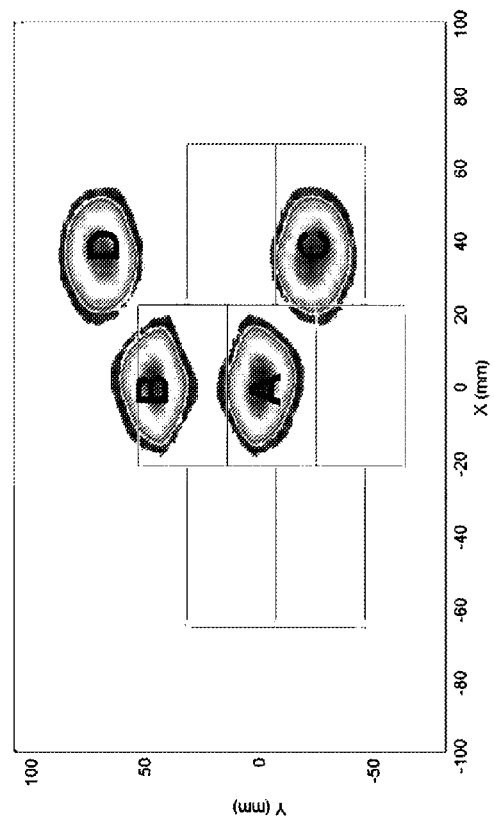
FIG. 5 is a focal plane map for two sources J1, J2.
Figure 7:
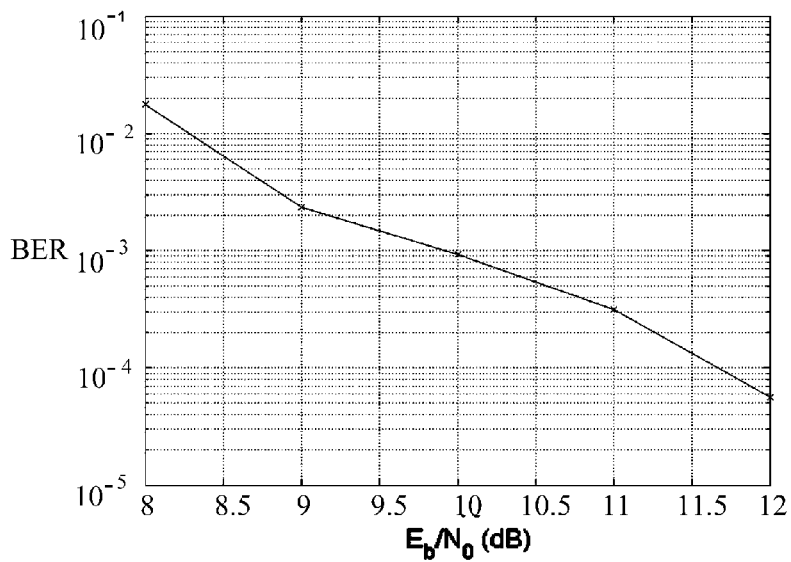
FIG. 7 graphically shows a BER curve for the present system.

The resulting focal plane field is as shown in FIG. 5. Given that the focal plane array now sees signals from two sources rather than only one, the basic CMA algorithm without interference cancellation would not be guaranteed to lock on to the desired source, which is source 1. Furthermore, if both telemetry streams are desired, the use of two independent CMA-based equalizers could result in both of them locking onto source 2 or both of them locking onto source 1. The IC-CMA algorithm permits the system to lock onto both. The overall BER performance, averaged over both sources, is shown in FIG. 7.

In sum, the use of an array of receiving elements 10 provides two advantages over a single one. First, it enables constructive addition of the incoming multipath ray, resulting in improved bit error rate (BER) performance under a range of operating conditions. Second, the presence of multiple elements in the focal plane enables real-time extraction of pointing information that can be used to identify both the main ray and the ground reflection ray. This enables reliable real-time pointing correction and target tracking even in the presence of multipath. It is important to distinguish the focal-plane tapped delay-line approach proposed above as fundamentally different from the phased-array approaches described in the background section, since with the focal-plane processing approach multipath signals and other interfering sources can be separated out without complicated signal processing under favorable conditions. This is an added bonus of using focal-plane arrays instead of conventional phased-array antennas.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of the invention. All structural, chemical, and functional equivalents to the elements of the above-described exemplary embodiments that are known to those of ordinary skill in the art are expressly incorporated herein by reference and are intended to be encompassed by the invention.

We claim:

1. A focal plane array antenna and processing system comprising:
 a parabolic dish antenna;
 a focal plane array comprising a plurality of focal plane antenna elements in the focal plane of said parabolic dish antenna;
 a processing system for reception of multiple telemetry streams simultaneously in the presence of multipath.

2. The focal plane array antenna and processing system according to claim 1, wherein said processing system includes a spatio-temporal filter.

3. The focal plane array antenna and processing system according to claim 2, wherein said spatio-temporal filter comprises a digital FIR filter for executing a constant modulus algorithm with interference cancelling and multiple beamforming.

4. The focal plane array antenna and processing system according to claim 1, wherein said processing system includes a downconverter connected to said focal plane array, a spatio-temporal FIR filter connected to said downconverter, an angle estimator connected to said spatio-temporal FIR filter, and a Kalman filter.

5. The focal plane array antenna and processing system according to claim 1, wherein the plurality of focal plane antenna elements further comprise seven antenna elements.

6. The focal plane array antenna and processing system according to claim 5, wherein the antenna elements of said focal plane array are arranged in a substantially hexagonal geometry.

7. The focal plane array antenna and processing system according to claim 1, wherein said processing system further comprising a spatio-temporal filter for deriving information on adaptive FIR filter weights, relative amplitudes and phases of the signals from said focal plane array.

8. The focal plane array antenna and processing system according to claim 7, further comprising an angle estimator connected to said spatio-temporal filter for computing a target's angular position with respect to the antenna's pointing axis.

9. A focal plane array antenna system comprising:
 a parabolic dish antenna;
 a focal plane array comprising a plurality of focal plane antenna elements in the focal plane of said parabolic dish antenna;

a spatio-temporal filter for deriving information on adaptive FIR filter weights, relative amplitudes and phases of the signals from said focal plane array;

an angle estimator connected to said spatio-temporal filter for computing a target's angular position with respect to the antenna's pointing axis;

a filter in communication with said angle estimator for extracting velocity and acceleration estimates from the time series data;

and an antenna control unit, in communication with said filter, used for pointing control of said parabolic dish antenna.

10. The focal plane array antenna system according to claim 9, wherein the antenna elements of said focal plane array are arranged in a substantially hexagonal geometry.

11. The focal plane array antenna system according to claim 9, wherein said filter for extracting velocity and acceleration estimates from the time series data comprises a Kalman filter.

12. The focal plane array antenna system according to claim 11, wherein said Kalman filter comprises a pair of 3-state Kalman filters.

13. A method of processing telemetry received from a target at a parabolic antenna in the presence of multipath, comprising the steps of:

receiving telemetry at a multi-receiving element radio frequency focal plane array positioned in a focal plane of said parabolic antenna to create a plurality of input signals having spatial diversity;

downconverting each of said plurality of input signals to complex baseband signal components;

combining each of said plurality of complex baseband signal components using adaptive filters and retaining information on the adaptive filter weights, relative amplitudes and phases of the complex baseband signal components;

computing instantaneous estimates of the target's angular position with respect to a pointing axis of said parabolic antenna;

producing time series data based on said computed target position estimates; and predicting angular velocity and acceleration of said target based on said time series data.

14. The method of claim 13, wherein said step of receiving telemetry at said multi-receiving element radio frequency focal plane array further comprises receiving telemetry from two or more sources within the field-of-view of said parabolic antenna.

15. The method of claim 13, further comprising a step of using the extracted angular velocity and acceleration estimates from the time series data to provide pointing control for said parabolic antenna.

16. The method of claim 13, wherein said step of combining each of said plurality of complex baseband signal components using filters further comprises using adaptive Finite Impulse Response (FIR) filters and retaining information on the adaptive FIR filter weights, relative amplitudes and phases of the complex baseband signal components.

17. The method of claim 13, wherein said step of combining each of said plurality of complex baseband signal components using filters further comprises coherently combining.

18. The method of claim 13 for processing telemetry received from multiple targets at a single parabolic antenna in the presence of multipath, wherein said step of receiving telemetry at a multi-receiving element radio frequency focal plane array comprises creating a plurality of input signals from each target each having spatial diversity, and said step of downconverting each of said plurality of input signals comprises downconverting to complex baseband signal components for each of said plurality of input signals, and said step of computing instantaneous estimates comprises computing estimates of each of said targets angular position with respect to a pointing axis of said parabolic antenna.

* * * * *

UNITED STATES PATENT AND TRADEMARK OFFICE
CERTIFICATE OF CORRECTION

| | | |
|---|---|---|
| PATENT NO. | : 8,022,860 B1 | Page 1 of 1 |
| APPLICATION NO. | : 11/781022 | |
| DATED | : September 20, 2011 | |
| INVENTOR(S) | : Ryan Mukai and Victor A. Vilnrotter | |

It is certified that error appears in the above-identified patent and that said Letters Patent is hereby corrected as shown below:

Title Page: Item 54 & Col. 1, Line 5

The word "PARABOIC" in the title of the patent should read "PARABOLIC"

Signed and Sealed this

Eighth Day of November, 2011

David J. Kappos
*Director of the United States Patent and Trademark Office*